(12) United States Patent
Tabrizian et al.

(10) Patent No.: US 11,677,426 B2
(45) Date of Patent: Jun. 13, 2023

(54) INTEGRATED FREQUENCY SELECTIVE LIMITER UTILIZING QUADRATIC AND AN-HARMONIC ENERGY SCATTERING

(71) Applicant: University of Florida Research Foundation, Incorporated, Gainesville, FL (US)

(72) Inventors: Roozbeh Tabrizian, Gainesville, FL (US); Troy R. Tharpe, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 206 days.

(21) Appl. No.: 17/304,993

(22) Filed: Jun. 29, 2021

(65) Prior Publication Data
US 2021/0409049 A1 Dec. 30, 2021

Related U.S. Application Data

(60) Provisional application No. 63/046,125, filed on Jun. 30, 2020.

(51) Int. Cl.
*H04B 1/12* (2006.01)
(52) U.S. Cl.
CPC ................. *H04B 1/123* (2013.01)
(58) Field of Classification Search
CPC ............ H04B 1/10; H04B 1/12; H04B 1/123
See application file for complete search history.

(56) References Cited

U.S. PATENT DOCUMENTS

| | | | |
|---|---|---|---|
| 3,147,427 A | 9/1964 | Varian | |
| 10,027,305 B1* | 7/2018 | Kozyrev | H03H 17/0261 |
| 10,426,366 B2* | 10/2019 | Sanger | A61B 5/486 |
| 2013/0241674 A1* | 9/2013 | Yamazaki | H03H 9/64 |
| | | | 333/189 |
| 2019/0372610 A1* | 12/2019 | Choi | H04B 1/0475 |
| 2020/0358501 A1* | 11/2020 | Hormis | H04B 7/026 |
| 2021/0174235 A1* | 6/2021 | Kues | G06N 10/00 |
| 2023/0006719 A1* | 1/2023 | Ashrafi | H04B 7/10 |

OTHER PUBLICATIONS

Giarola, Attílio José. *A Review of the Theory, Characteristics, and Operation of Frequency Selective Limiters*, Proceedings of the IEEE, vol. 67, No. 10, pp. 1380-1396, Oct. 1979, DOI: 10.1109/PROC.1979.11474.

Orth, Roger W. *Frequency-Selective Limiters and Their Application*, IEEE Transactions on Electromagnetic Compatibility, vol. EMC-10, No. 2, pp. 273-283, Jun. 1968, DOI: 10.1109/TEMC.1968.302963.

* cited by examiner

*Primary Examiner* — Thanh C Le
(74) *Attorney, Agent, or Firm* — Alston & Bird LLP

(57) ABSTRACT

An adaptive filter includes, in part, a linear filter, and a non-linear resonator coupled to the linear filter and adapted to resonate at a frequency that is an integer multiple of the frequency of a received RF signal. The adaptive filter filters out the received RF signal. The resonant frequency may be twice the frequency of the received RF signal. The adaptive filter optionally includes a second non-linear resonator coupled to the linear filter and adapted to resonate at a frequency defined by a sum of the integer multiple of the frequency of the received signal and an offset frequency.

27 Claims, 15 Drawing Sheets

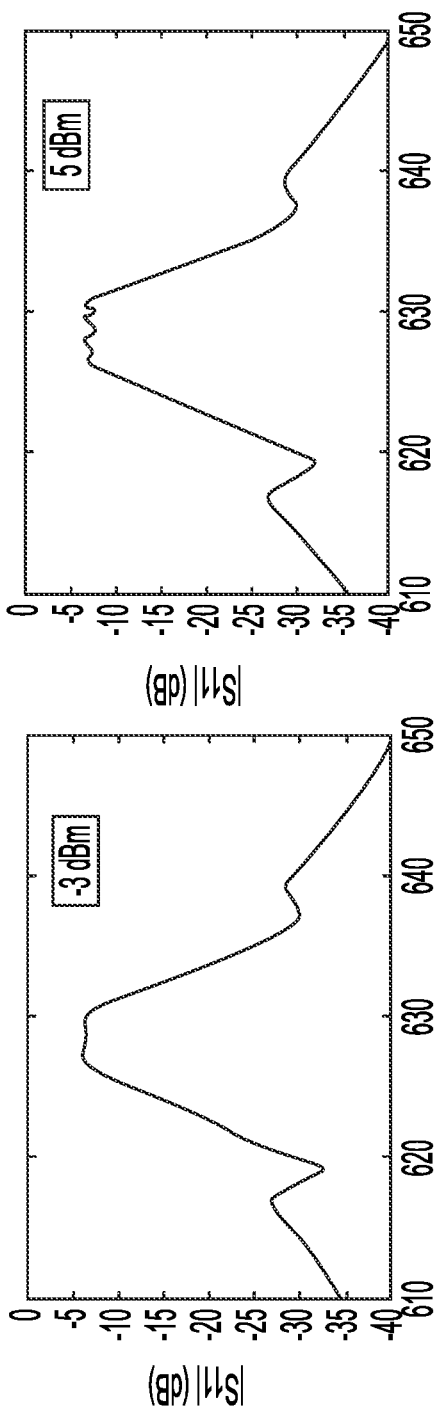
FIG. 10A
FIG. 10B
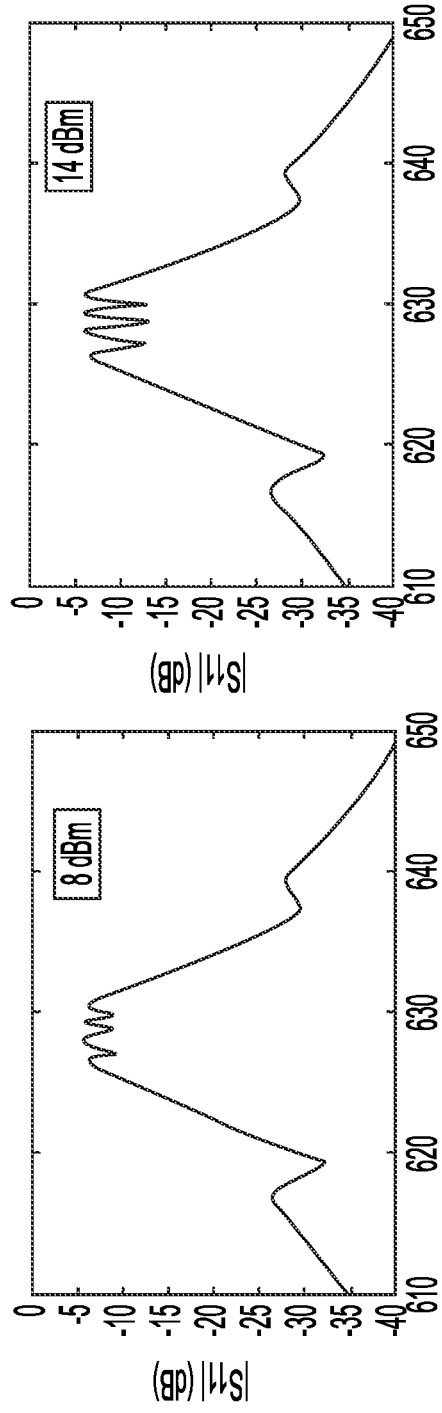
FIG. 10C
FIG. 10D

INTEGRATED FREQUENCY SELECTIVE LIMITER UTILIZING QUADRATIC AND AN-HARMONIC ENERGY SCATTERING

RELATED APPLICATION

The present application claims benefit under 35 USC 119(e) of U.S. patent application Ser. No. 63/046,125, filed Jun. 30, 2020, the content of which is incorporated herein by reference in its entirety.

STATE OF GOVERNMENT SUPPORT

This invention was made with government support under D19AP00044 awarded by the Defense Advanced Research Projects Agency (DARPA). The government has certain rights in the invention.

TECHNICAL FIELD

The present application relates to integrated circuits, and more particularly to frequency selective limiters.

BACKGROUND

Frequency selective limiters (FSLs) are used to secure wireless communication systems against malicious in-band interference. An FSL is often used within a Radio Frequency (RF) front-end module to mitigate the effects of in-band jamming, and to suppress interference by signals that may saturate or perturb analog/digital signal processing components of a wireless communication system.

An FSL described in U.S. Pat. No. 3,147,427A, issued in 1953 to R. H. Varian, uses nuclear magnetic resonance (NMR) to couple a signal's amplitude with an RF filter. However, an NMR-based FSL may only operate at low input frequencies, e.g. below 500 MHz, have insertion losses over 20 dB, and cannot be integrated at chip-scale due to large size and incompatible constituent materials. Ferrite crystals such as Yttrium Iron Garnet (YIG) have also been used to make FSLs. However, such parametric FSLs suffer from input selectivity, exhibit small absorption bands, have large sizes, and include materials that make them incompatible for use in large-scale integration.

Other conventional FSL systems use stagger-tuned LRC resonators and parallel avalanche diodes to form frequency-amplitude dependent circuitry. However, due to their inherently low-quality factor (Q), such FSLs have low selectivity between input signals, poor small signal suppression, and exhibit large layout footprints.

Software-based solutions relying on machine learning (ML) have also been used to form FSL-type adaptive notch filters. However, ML-based systems have excessive latency, and consume relatively large power.

SUMMARY

An adaptive filter, in accordance with one embodiment of the present disclosure, includes, in part, a liner filter, and a non-linear resonator coupled to the linear filter and adapted to resonate at a frequency that is an integer multiple of the frequency of a received RF signal. The adaptive filter filters out the received RF signal. In one embodiment, the non-linear resonator is adapted to generate a damped voltage that is substantially equal to a square of the voltage of the received RF signal. The damped voltage oscillates at the resonant frequency.

In one embodiment, the resonant frequency is twice the frequency of the received RF signal. In one embodiment, the adaptive filter further includes, in part, a second non-linear resonator coupled to the linear filter and adapted to resonate at a frequency defined by a sum of the integer multiple of the frequency of the received signal and an offset frequency.

In one embodiment, the adaptive filter further includes, in part, a third non-linear resonator coupled in series with the first non-linear resonator and adapted to resonate at the integer multiple of the frequency of the received signal. In one embodiment, the adaptive filter further includes, in part, a fourth non-linear resonator coupled in series with the second non-linear resonator and adapted to resonate at the frequency defined by the sum of the integer multiple of the frequency of the received signal and the offset frequency.

In one embodiment, the adaptive filter further includes, in part, a comparator adapted to compare a voltage across a resistor to a threshold voltage and to supply, in response, a current to a semiconductor substrate in which the first and third non-linear resonators are disposed. The voltage across the resistor is formed in response to the current generated by the first and the third non-linear resonators.

In one embodiment, the resonant frequency of the non-linear resonator is controlled by varying a thickness of the non-linear resonator. In one embodiment, the resonant frequency of the non-linear resonator is controlled by varying the biasing voltage applied to the non-linear resonator. In one embodiment, the resonant frequency of the non-linear resonator is controlled in response to a heat applied to the non-linear resonator. In one embodiment, the resonant frequency of the non-linear resonator is controlled in response to varying a lateral dimension of the non-linear resonator. In one embodiment, the non-linear resonator is a ferroelectric resonator. In one embodiment, the ferroelectric resonator includes a hafnium zirconium oxide ($Hf_{0.5}Zr_{0.5}O_2$) film.

A non-linear resonator, in accordance with one embodiment of the present disclosure, is biased to receive an RF signal, resonate at a frequency that is an integer multiple of the frequency of the RF signal, and filter out the received RF signal.

A method of filtering an RF signal, in accordance with one embodiment of the present disclosure, includes, in part, receiving the RF signal at a first port coupled to a linear filter, supplying an output signal of the linear filter to a non-linear resonator adapted to resonate at a frequency that is an integer multiple of the frequency of the received RF signal, and filtering out the received RF signal.

In one embodiment, the non-linear resonator is further adapted to generate a damped voltage that is substantially equal to a square of the voltage of the received RF signal. The damped voltage oscillates at the resonant frequency. In one embodiment, the resonant frequency is twice the frequency of the received signal.

In one embodiment, the method further includes, in part, coupling a second non-linear resonator to the linear filter. The second non-linear resonator is adapted to resonate at a frequency defined by a sum of the integer multiple of the frequency of the received signal and an offset frequency. In one embodiment, the method further includes, in part, coupling a third non-linear resonator in series with the first non-linear resonator. The third non-linear resonator is adapted to resonate at the integer multiple of the frequency of the received signal. In one embodiment, the method further includes, in part, coupling a fourth non-linear resonator in series with the second resonator. The fourth non-linear resonator is adapted to resonate at the frequency defined by the sum of the integer multiple of the frequency of the received signal and the offset frequency.

In one embodiment, the method further includes, in part, comparing a voltage across a resistor to a threshold voltage, and supplying, in response, a current to a semiconductor substrate in which the first and third resonators are disposed. The voltage across the resistor is formed in response to a current generated by the first and the third non-linear resonators.

In one embodiment, the resonant frequency of the non-linear resonator is controlled by varying a thickness of the non-linear resonator. In one embodiment, the resonant frequency of the non-linear resonator is controlled by varying the biasing voltage applied to the non-linear resonator. In one embodiment, the resonant frequency of the non-linear resonator is controlled in response to varying a lateral dimension of the non-linear resonator. In one embodiment, the resonant frequency of the non-linear resonator is controlled in response to a heat applied to the non-linear resonator. In one embodiment, the non-linear resonator is a ferroelectric resonator. In one embodiment, the ferroelectric resonator includes a hafnium zirconium oxide ($Hf_{0.5}Zr_{0.5}O_2$) film.

BRIEF DESCRIPTION OF THE DRAWINGS

FIGS. 10A-10D show the transfer function of the adaptive filter of FIG. 9 at different input powers, in accordance with one exemplary embodiment of the present disclosure.

DETAILED DESCRIPTION

Figure 1A:
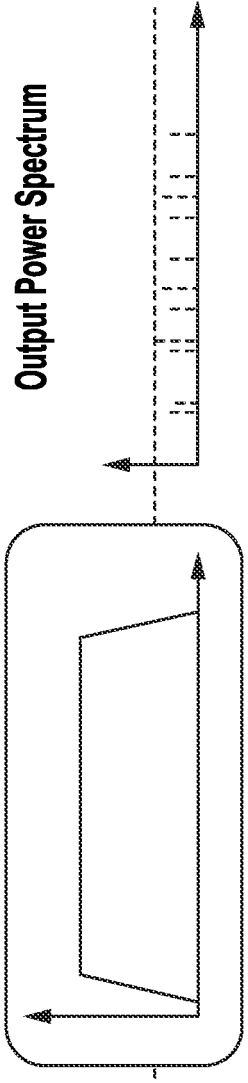
FIGS. 1A, 1B and 1C show the transfer function characteristic and output power spectrum of an adaptive frequency selective limiter, in accordance with one exemplary embodiment of the present disclosure.
Figure 1B:
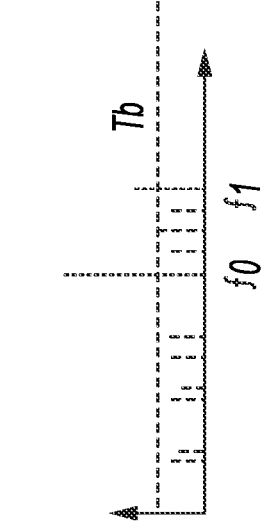
Figure 1C:
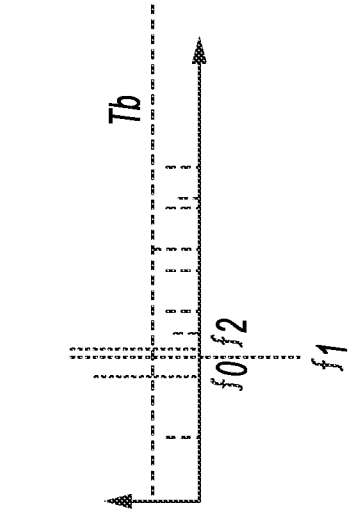

An FSL is a two-port system adapted to maintain the output signal frequency within a desired and controllable passband, and further to maintain the output signal amplitude below a desired and controllable threshold. FIGS. 1A, 1B and 1C show exemplary adaptive transfer functions of an FSL, in accordance with one embodiment of the present invention. In FIG. 1A, the amplitudes of the signals over the received frequency spectrum is below the threshold limit Th. Accordingly, the output spectrum supplied by the FLS is unchanged. In FIG. 1B, the amplitudes of the signals at frequencies $f_0$ and $f_1$ exceed the threshold limit of Th. Therefore, the FLS adaptively changes its transfer function characteristics so as to include notches at frequencies $f_0$ and $f_1$. The output spectrum of the FSL in FIG. 1B shows the amplitudes of the signals at frequencies $f_0$ and $f_1$ are set to the limit value of Th. In FIG. 1C, the amplitudes of the signals at frequencies $f_0$, $f_1$ and $f_2$ are shown as exceeding the threshold limit of Th. Therefore, the FLS adapts its transfer function characteristics so as to include notches at frequencies $f_0$, $f_1$ and $f_2$. The output spectrum of the FSL in FIG. 1C shows the amplitudes of the signals at frequencies $f_0$, $f_1$ and $f_2$ are set to the limit value of Th.

Figure 2:
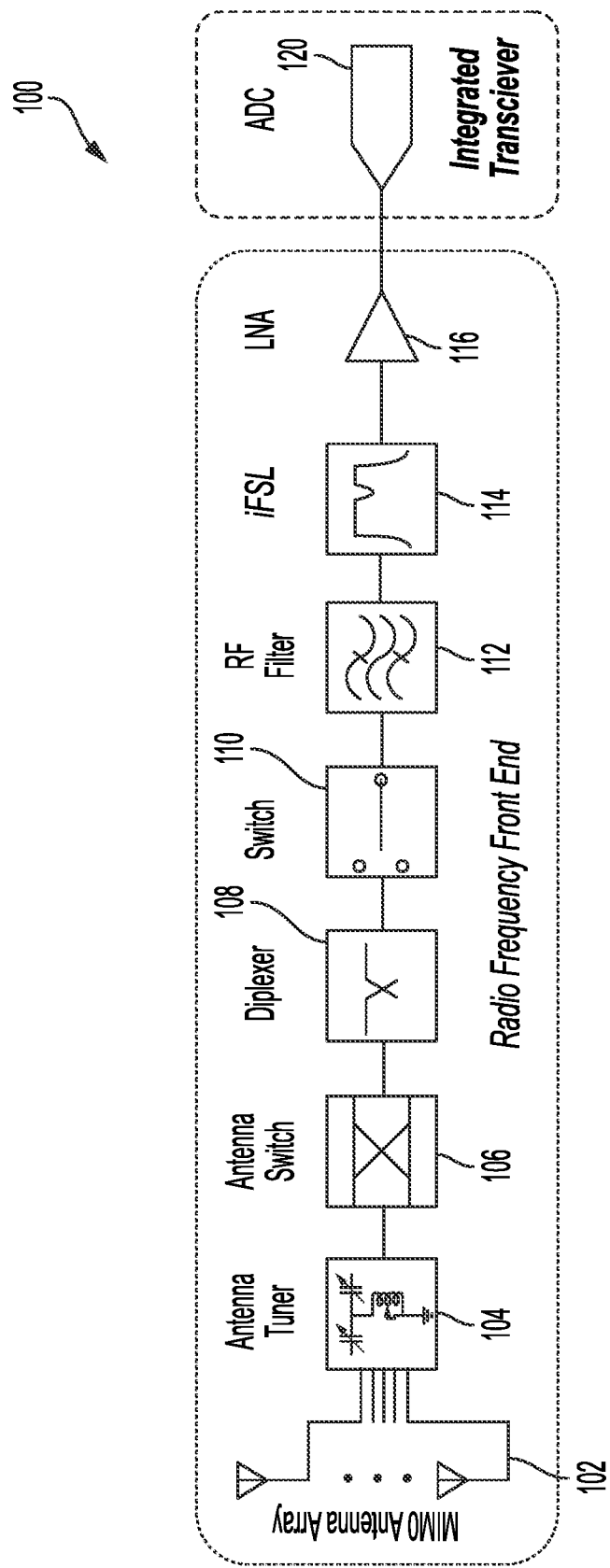
FIG. 2 is a block diagram of a wireless communication receiving system that includes a frequency selective limiter, in accordance with one embodiment of the present disclosure.

Due to such frequency/amplitude dependent adaptive transfer function characteristic, an FSL, in accordance with embodiments of the present disclosure, may be used in any wireless communication system operating in an interference saturated environment. FIG. 2 is a block diagram of a wireless communication receiving system 100 having disposed therein an FLS, in accordance with embodiments of the present disclosure, to achieve jamming/interference immunity. System 100 is shown as including, in part, a multiple input, multiple output (MIMO) antenna array 102, an antenna tuner 104, an antenna switch 106, a diplexer 108, a switch 110, an RF filter 112, a FSL 114, and a low-noise amplifier 116. The output of LNA 116 is shown as being delivered to an analog-to-digital converter (ADC) 120 for further processing.

Figure 3A:
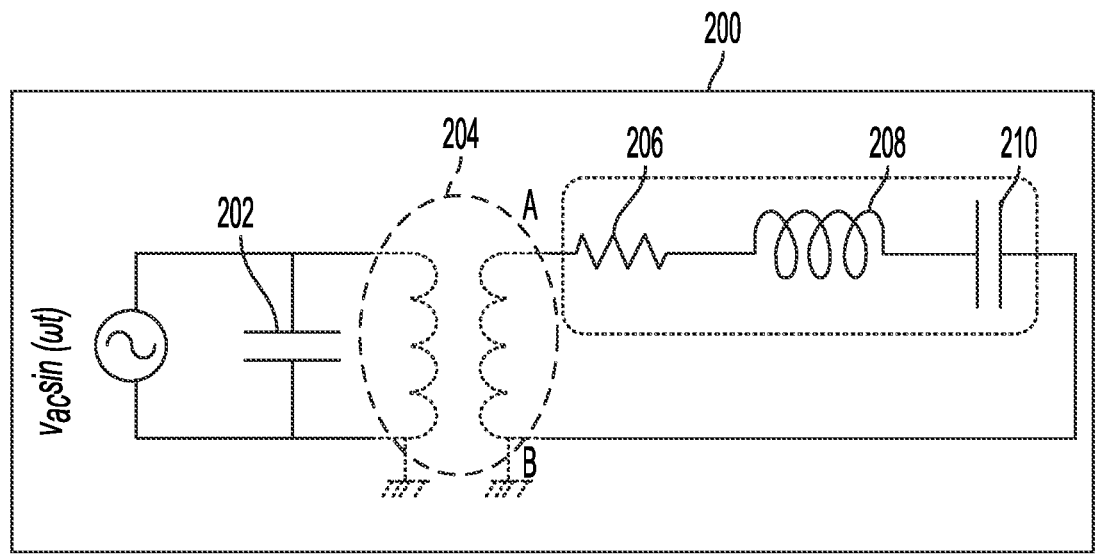
FIG. 3A is a schematic diagram of a lumped-element model of a frequency selective limiter, in accordance with one embodiment of the present disclosure.

FIG. 3A depicts a lumped element model of a nonlinear resonator 200, operating as a power limiting zero within an FSL. The lumped element model of the nonlinear resonator is shown as including a static capacitor 202, coupled in parallel across a nonlinear transforming component 204. Resistor 206, together with inductor 208 and capacitor 210 represent the motional branch of the nonlinear resonator serving as a frequency selective current damper.

In accordance with one aspect of the present disclosure, a voltage applied to the resonator increases quadratically across nodes A and B of transforming component 204. Accordingly, a sinusoidal voltage defined by $V_{ac} \sin(\omega t)$ and applied to the resonator, results in a voltage of $kV_{ac}^2$ across nodes A and B, where k is a proportionality constant. Moreover, inductor 208 and capacitor 210 are tuned to provide a low impedance signal path to the ground at super harmonic resonance frequencies of the applied sinusoidal input, $V_{ac} \sin(\omega t)$. In one embodiment, the super-harmonic resonant frequency is $2\omega$. It is understood, however, that the resonant frequency may be $n\omega$, where n is an integer equal to or greater than 2. Accordingly, the energy of an interference or jamming signal having a frequency of, for example, $\omega$, is scattered to a super-harmonic of this frequency and stored as mechanical energy in the resonator at the resonant frequency. The stored energy is then dissipated over time. Due to the super harmonic energy scattering supplied by transforming component 204, the interference or jamming signal is advantageously not reflected back into the system. In one embodiment, the FLS is a ferro-electric type mechanical resonator.

Figure 3B:
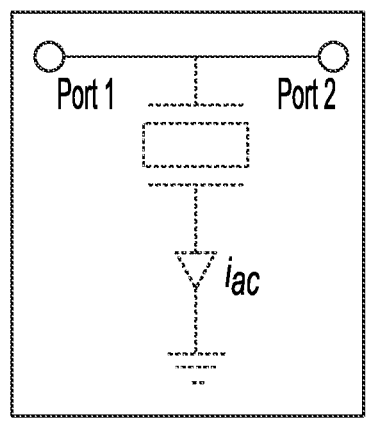
FIG. 3B shows a non-linear resonator used to form a frequency selective limiter, in accordance with one embodiment of the present disclosure.

FIG. 3B is another representation of the lumped-element model of the FSL shown in FIG. 3A. The FSL is represented as a shunt resonator connected to ports 1 and 2 of the FSL. Current signal $i_{ac}$ has a frequency that is a super-harmonic of the frequency of the signal applied to ports 1 and 2 of the FSL.

Figure 3C:
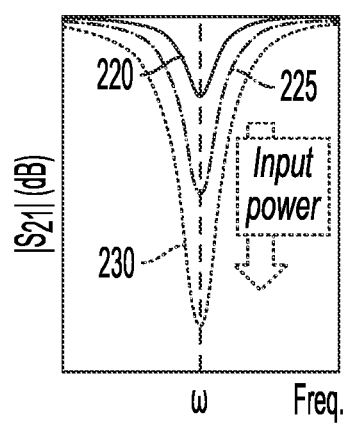
FIG. 3C shows the $S_{21}$ parameter of the non-linear resonator of FIG. 3B as the power received by the resonator increases.
Figure 3D:
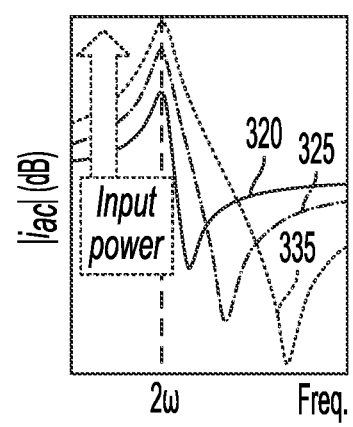
FIG. 3D shows the current generated by the non-linear resonator of FIG. 3B, as the power received by the resonator increases.

FIGS. 3C and 3D show the non-linear (e.g., quadratic coupling), and frequency scattering characteristic of the FSL of FIG. 3A. Plots 220, 225 and 230 of FIG. 3C represent the $S_{21}$ parameter of the FSL in dB as the power received by the resonator at the frequency of $\omega$ increases. As is readily seen, the larger the amplitude of the received signal, the deeper the notch at the frequency of $\omega$ is, and hence the system's insertion loss is also greater. The mechanical energy stored in the resonator dissipates at a rate corresponding to the resonator Quality factor (Q). Plots 320, 325 and 330 of FIG. 3D represent the current shown in FIG. 3B, as the power received by the resonator at the frequency of $\omega$ increases. It is seen that the current has a super-harmonic resonant frequency of $2\omega$ that increases non-linearly (e.g., quadratically) as the power received by the resonator increases.

Figure 4A:
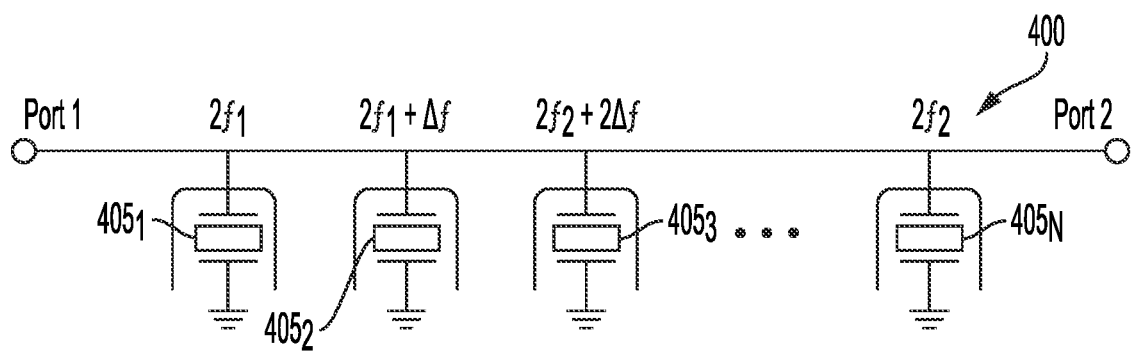
FIG. 4A shows an array of non-linear resonators coupled to form a wideband filter, in accordance with one exemplary embodiment of the present disclosure.

To increase the frequency band, in one embodiment, a multitude of FSL cells may be coupled to one another in parallel. FIG. 4A shows a multitude of FSL cells coupled in parallel to form a wideband FSL module 400, in accordance with one embodiment of the present disclosure. As seen, FLS module 400 is shown as including N FSL cells $405_1$, $405_2$ ... $405_N$. FSL cell $405_1$ is adapted to scatter the energy of an incident signal having a frequency $f_1$ to $2 f_1$, FSL cell $405_2$ is adapted to scatter the energy of the incident signal to a frequency to $2f_1+\Delta f$ ... and FSL cell $405_N$ is adapted to scatter the energy of the incident signal to a frequency to $(2f_1+N\Delta f=2f_2)$. Accordingly, FLS module 400 is a wideband amplitude adaptive notch filter adapted to provide jamming/interference immunity against signals ranging in frequency from $f_1$ to $f_2$. Although in FIG. 4A, the frequency difference between each pair of successive FSL cells $405_i$ and $405_{i+1}$ (i is an index ranging from 1 to N) is shown as being equal to $\Delta f$, it is understood that embodiments of the present disclosure are not so limited and that in other embodiments, the frequency difference between successive pairs of FSL cells may have varied values.

The frequency of a resonator may be tuned using a number of different techniques. In accordance with one technique, by changing the thickness of the resonator, or changing the lateral dimensions of the resonator, the frequency of the resonator may be tuned. In accordance with another technique, the frequency of a ferroelectric or antiferroelectric resonator may be tuned by varying a DC voltage applied to the resonator. In accordance with yet another technique, when the resonator has an additional semiconductor layer, the tuning of the frequency of the resonator may be achieved by Joule heating of the resonator through passing a DC or AC current therethrough.

Figure 4B:
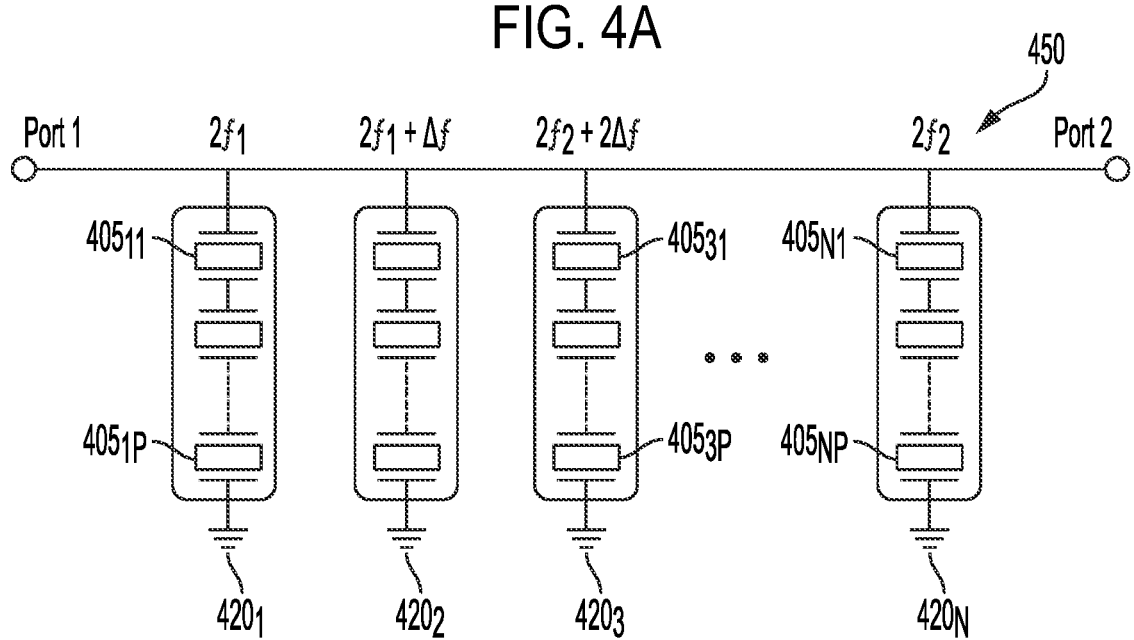
FIG. 4B shows an array of non-linear resonators coupled to form a wideband filter, with series resonators included to tailor the limiting threshold of input power, in accordance with one embodiment of the present disclosure.

To increase the power handling capability of an FSL module, a number of FSL cells may be coupled in series at each desired frequency. FIG. 4B shows an FSL module 450 that is similar to FSL module 400 except that FSL module 450 has P FSL cells connected in series at each of the shown frequencies. For example, FSL module 450 is shown as including, in part, FSL cells $405_{11}$, $405_{12}$ and $405_{1P}$ that are connected in series to form branch $420_1$ and adapted to resonate at a frequency of $2f_1$; FSL cells $405_{31}$, $405_{32}$ and $405_{3P}$ that are connected in series to form branch $420_3$ are adapted to resonate at an offset frequency of $2f_1+24$; and FSL cells $405_{N1}$, $405_{N2}$ and $405_{NP}$ that are connected in series to form branch $420_N$ are adapted to resonate at an offset frequency of $2f_2+N\Delta f=2f_2$.

Figure 4C:
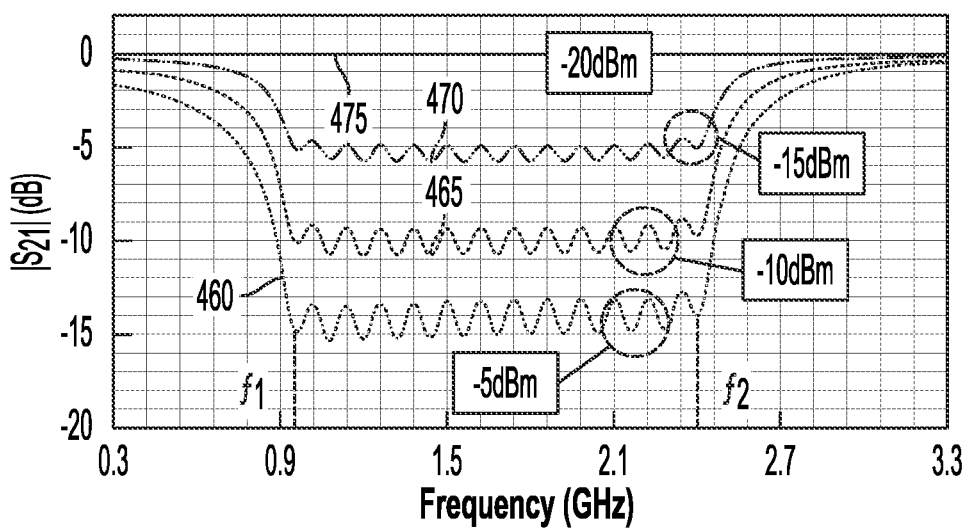
FIG. 4C shows an exemplary insertion loss response of the array of non-linear resonators of FIG. 4B at various input power levels.

FIG. 4C shows an exemplary $S_{21}$ insertion loss response of FSL module 450 at various input power levels in dBm. Plots 460, 465, 470 and 475 respectively show the $S_{21}$ insertion loss response of FSL module 450 at input power levels of −5 dBm, −10 dBm, −15 dBm, and −20 dBm. Increasing the number of series connected FSL cells in the branches results in a corresponding increase in input power threshold level needed for the formation of an adaptive notch in $S_{21}$. Conversely, decreasing the number of series connected FSL cells in the branches results in a decrease in the input power level threshold needed for the formation of an adaptive notch in $S_{21}$. Thus, by forming an array of nonlinear resonators as described above with reference to FIGS. 4A and 4B, a controllable frequency and amplitude dependent path from signal to ground is formed. Furthermore, by using nonlinear super-harmonic transduction, an FSL module/system, in accordance with embodiments of the present disclosure, displays low latency, and low cost, while maintaining a compact form.

Figure 4D:
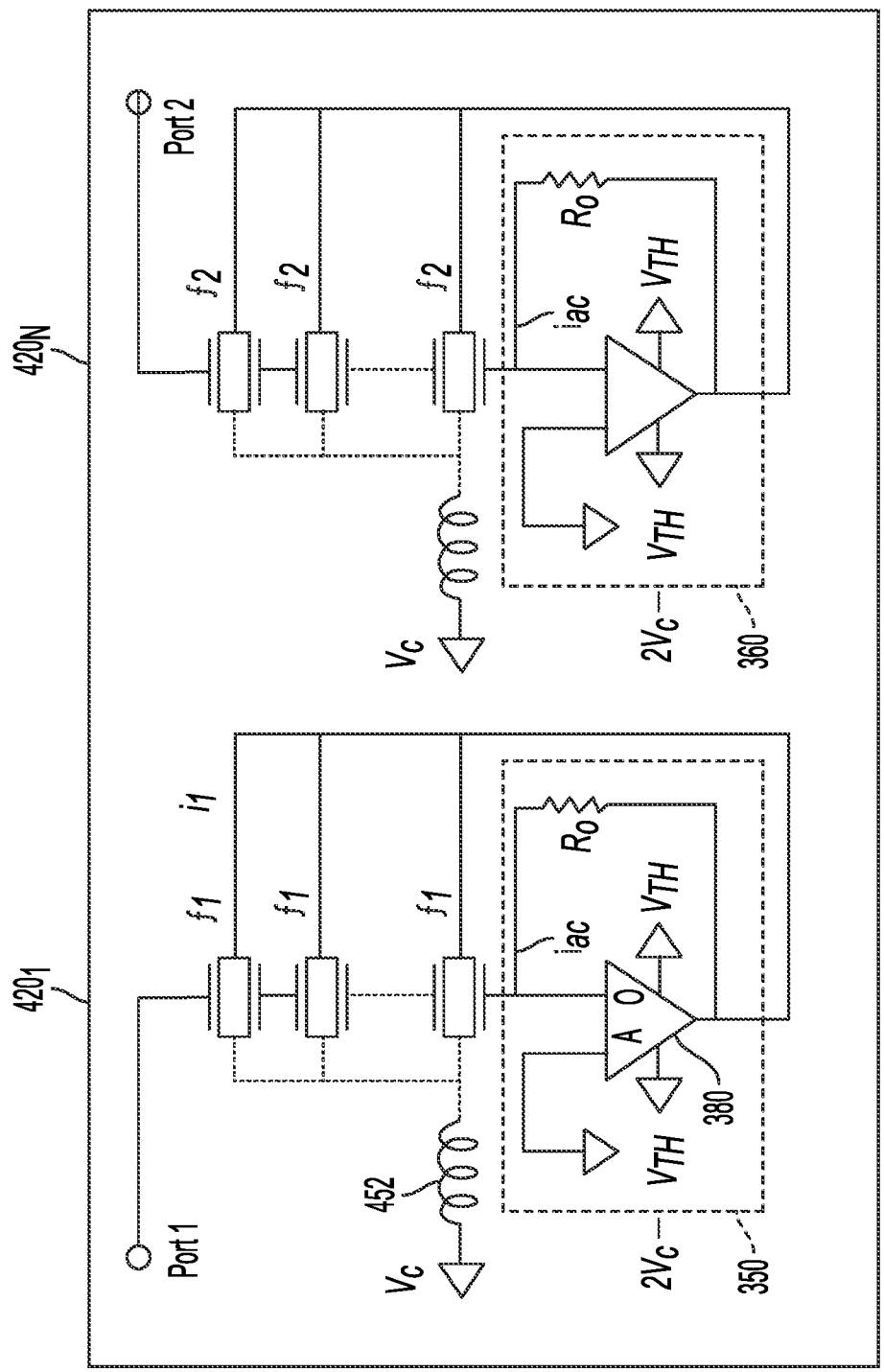
FIG. 4D shows circuitry adapted to automatically tune the frequency of an array of non-linear resonators, in accordance with one exemplary embodiment of the present disclosure.

FIG. 4D shows circuits 350 and 360 adapted to automatically tune the frequency of FSLs disposed respectively in branches $420_1$ and $420_N$ of FSL module 450 of FIG. 4B. Such auto-tuning causes the resonators to remain tuned to a nearby jammer frequency. Circuit 350 is shown as including, in part, a comparator 380 adapted to compare the voltages at its terminals A and B, and to generate current $i_1$ in response. As was described above, current $i_{ac}$ flowing through resistor $R_0$ has a frequency that is nearly twice the frequency of the received RF signal. Current $i_1$, which is a relatively small DC current, is fed back to the semiconductor substrate in which the resonators are formed to tune their frequency via Joule heating, as described above. The voltages used by the comparator are $(2V_c-V_{TH})$ and $V_{TH}$, where $V_c$ is the voltage used to bias the FSLs and $V_{TH}$ is a threshold voltage used for comparison by the comparator. Circuit 360 operates in a manner similar to circuit 350. Although not shown, it is understood that other branches of FSL module 450 may also include such auto-tuning circuits.

Figure 4E:
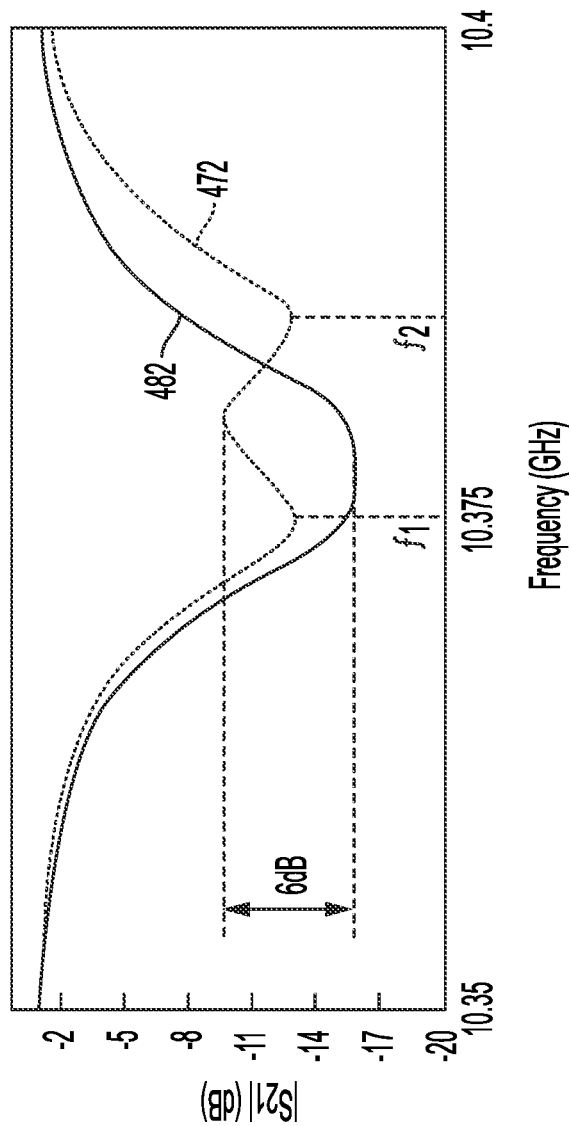
FIG. 4E shows the response of an array of non-linear resonators with and without the circuitry shown in FIG. 4D.

Plot 482 of FIG. 4E show the $S_{21}$ parameter of FSL module 450 when adapted to include auto-tuning circuits similar to auto-tuning circuits 350 and 360. Plot 472 of FIG. 4E show the $S_{21}$ parameter of FSL module 450 that does not include auto-tuning circuits. It is seen that the use of the auto-tuning circuits, in accordance with one aspect of the present disclosure, improves the interference rejection level by several dBs.

Figure 5A:
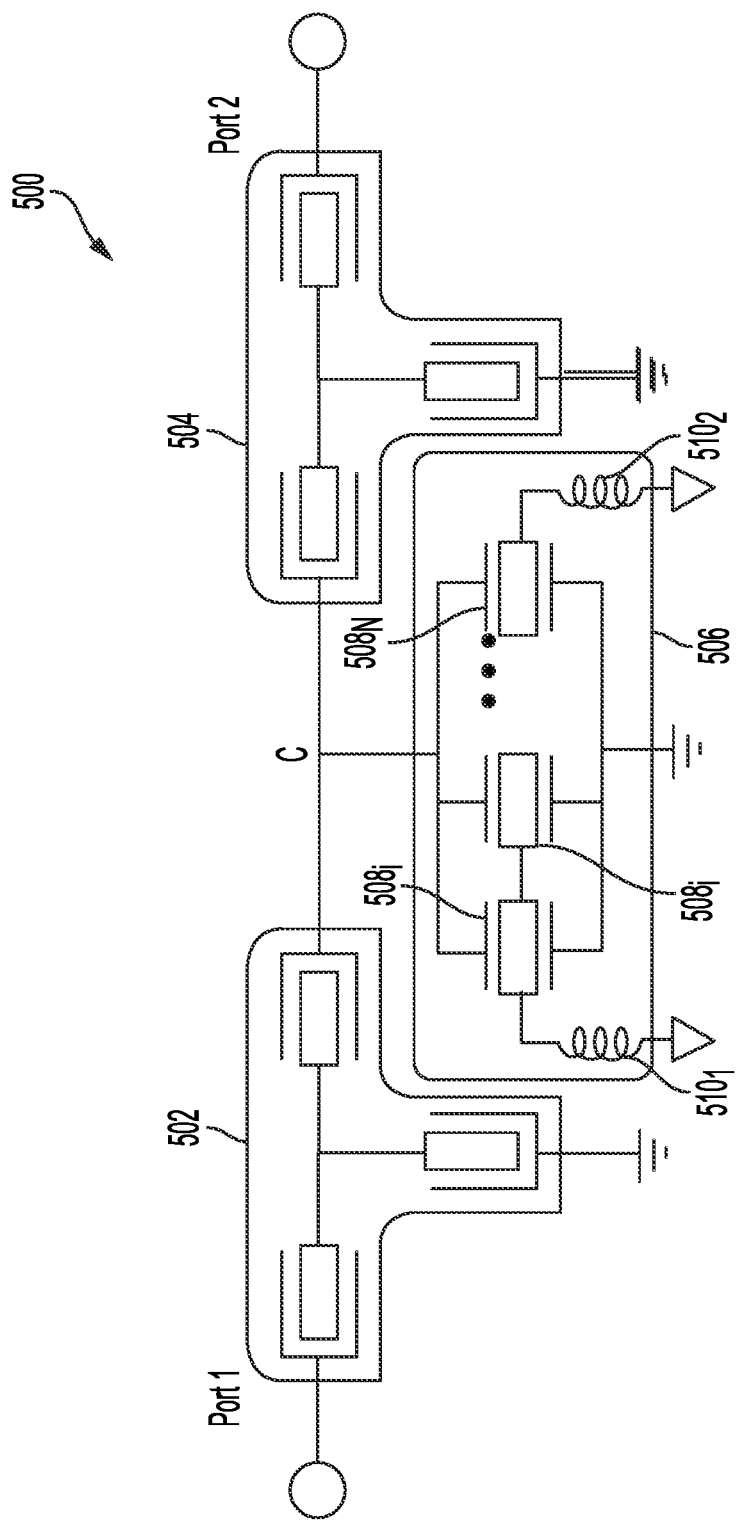
FIG. 5A shows an adaptive filter, in accordance with one exemplary embodiment of the present disclosure.

In accordance with one embodiment of the present disclosure, a chip-scale instinctually adaptive spectral processor (CIASP) includes, in part, one or more linear resonators coupled to one or more non-linear resonators to form a band-pass filter having a transfer function defined by the input signal power. FIG. 5A shows a CIASP 500, in accordance with one embodiment of the present disclosure. Exemplary CIASP 500, which is also referred to herein as an adaptive filter, is shown as including, in part, a pair of linear filters 502, 504, and a nonlinear resonator module 506 coupled therebetween at node C. Non-linear resonator module 506 is shown as including N non-linear resonators $508_1$, $508_2$ ... $508_N$ similar to non-linear resonator module 400 shown in FIG. 4A. In other embodiments, non-linear resonator module 506 may be similar to that shown in FIG. 4B. In other embodiments, non-linear resonator module 506 may include only a single non-linear resonator (alternatively referred to herein as resonator element), such as that shown in FIG. 3B. Inductors 5101 and 5102 are used to bias the non-linear resonator so as to ensure that the non-linear resonator operates in a non-linear region. The nonlinear resonator elements operate as power-limiting zeros that enable grounding of the input signal with an increasing efficiency at higher input powers.

The transfer function of the CIASP 500 may be defined as:

$$H_{CISAP}(s) = H_{BP}(s) \cdot \frac{\prod_i \left(\left(s - \left(\frac{R}{P_{in}(s)} + j\omega_i\right)\right)\left(s - \left(\frac{R}{P_{in}(s)} - j\omega_i\right)\right)\right)}{\prod_i \left(s - \frac{R}{P_{in}(s)}\right)^2}$$

In the above expression, R represents the impedance of the nonlinear resonators at $2\omega_i$, and $P_{in}$ represents the input power at each frequency.

Figure 5C:
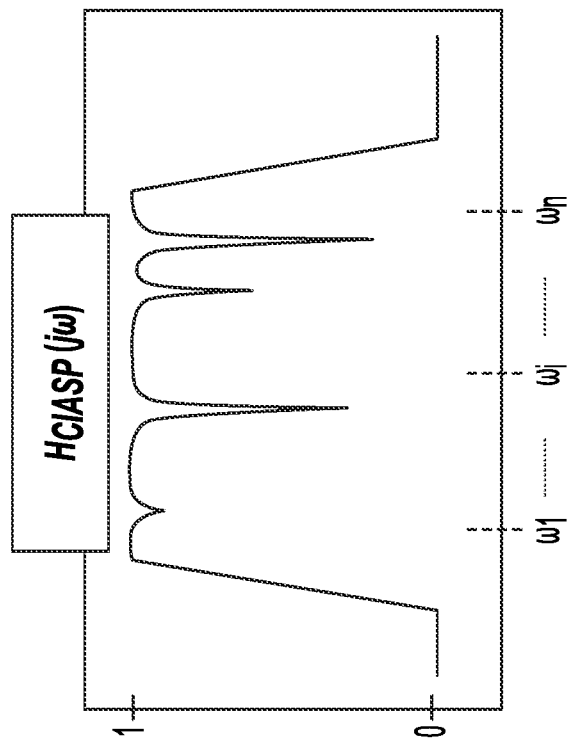
FIG. 5C shows an exemplary transfer function of the adaptive filter of FIG. 5A, in accordance with one exemplary embodiment of the present disclosure.
Figure 5B:
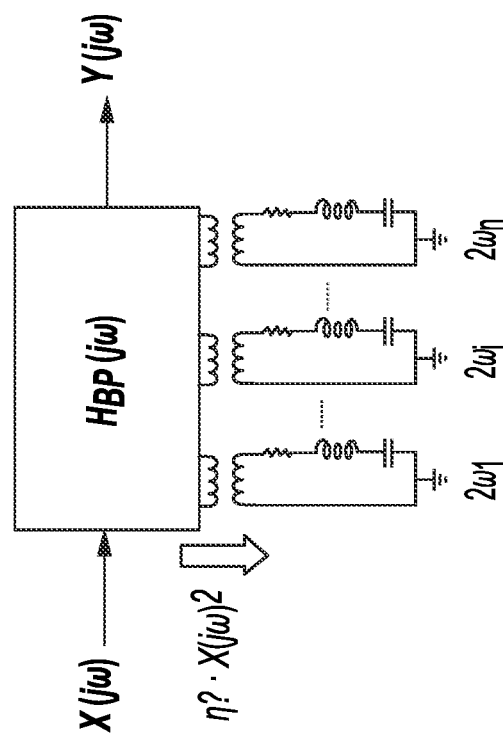
FIG. 5B shows a lumped-element model of the adaptive filter of FIG. 5A, in accordance with one exemplary embodiment of the present disclosure.

FIG. 5B shows a lumped-element model of CIASP 500. As is seen, each non-linear resonator disposed in CIASP 500 has a lumped-element model similar to that shown in FIG. 3A. Non-linear resonator $508_1$ is adapted to scatter the energy of an incident signal $(X(j\omega))$ having a frequency of $\omega_1$ to a super harmonic frequency of e.g., to $2\omega_1$; non-linear resonator $508_1$ is adapted to scatter the energy of an incident signal having a frequency of $\omega_i$ to a super harmonic frequency of, e.g., $2\omega_i$; and non-linear resonator $508_N$ is adapted to scatter the energy of an incident signal having a frequency of $\omega_n$ to a super harmonic frequency of, e.g., $2\omega_n$.

FIG. 5C shows an exemplary transfer function of CIASP 500 when an interference/jamming signal(s) has four frequency components falling within non-linear resonator module 506 wideband frequency range of $(\omega_N-\omega_i)$. CIASP 500 is adapted to create notches when the input power at a specific frequency becomes larger than a threshold value, as described above. As was also described in detail above, the larger the amplitude of the jamming/interference signal, the deeper is the notch.

Figure 6:
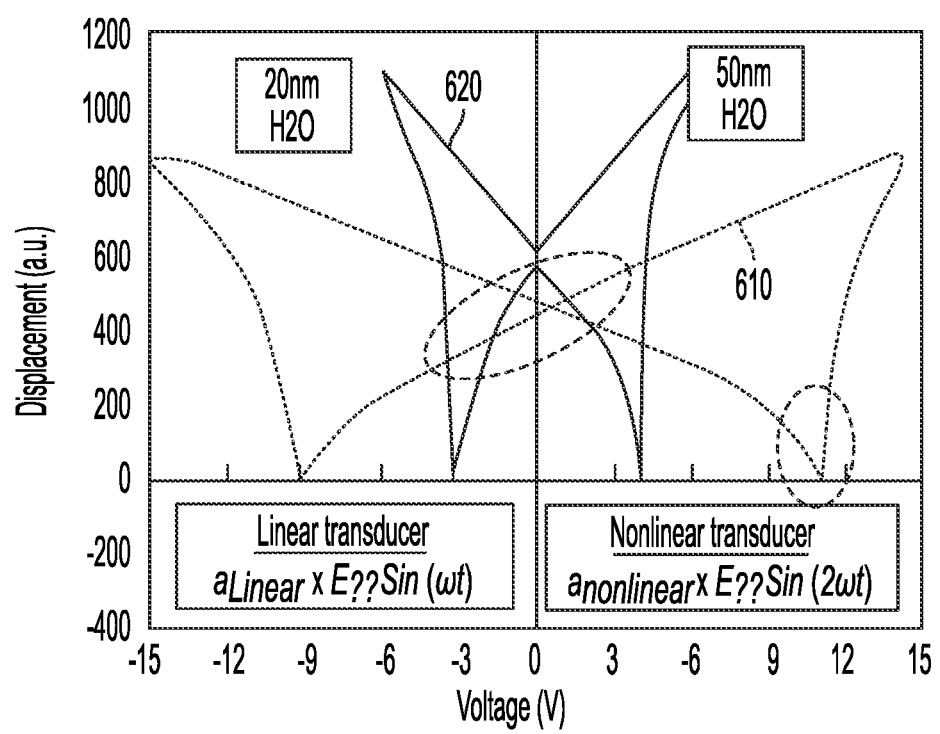
FIG. 6 shows an exemplary electromechanical response of biased ferroelectric films having different thicknesses, in accordance with one exemplary embodiment of the present disclosure.

The power-limiting zeros used in a CIASP may be achieved by forming high-Q acoustic resonators in ferroelectric or anti-ferroelectric transducer films with nonlinear electromechanical coupling. FIG. 6 shows the electromechanical response of ferroelectric films with different thicknesses that show nonlinear/quadratic behavior when biased at a suitable voltage. Plot 610 shows the nonlinear/quadratic behavior of an $Hf_{0.5}Zr_{0.5}O_2$ film having a thickness of 50 nm, and plot 620 shows the nonlinear/quadratic behavior of an $Hf_{0.5}Zr_{0.5}O_2$ film having a thickness of 20 nm. The same films operate in linear electromechanical transduction regime when they do not receive a DC bias. This enables using the same films for the formation of the linear resonators in a CIASP architecture. In other embodiments, anti-ferroelectric materials which do not require a DC bias to enable the transducer to operate in a nonlinear/quadratic regime may also be used. In one embodiment, the anti-ferroelectric material used to form a nonlinear transducer may be barium strontium titanate.

The nonlinear resonators in a CIASP, in accordance with one embodiment, may be formed by biasing the ferroelectric or antiferroelectric transducer to provide quadratic electromechanical transduction. Accordingly, application of an electrical signal at a frequency of $\omega_i$ results in mechanical motion at a frequency of $2\omega_i$ (or other super-harmonic resonant frequencies of $\omega_i$) due to the quadratic relation, as shown in FIG. 6. If the resonator has a resonance mode at $2\omega_i$, the energy of the electrical signal at $\omega_i$ is converted to damped mechanical motion. The quadratic relationship between the electrical and mechanical signals causes the efficiency of the nonlinear scattering to increase at higher signal powers, thereby resulting in the energy scattering out of the system with higher efficiency. Such power-dependent nonlinear scattering results in notches having depths that are power-dependent, as shown, for example, in FIG. 5C. When a jammer/interference signal is present at a relatively large power, a relatively deep notch is formed in the transfer function, thereby to reject the jammer without affecting the other low-power signals over the entire band. The higher the power of the jammer/interference signal, due to quadratic nature of the scattering and in accordance with embodiments of the present disclosure, the deeper is the notch. To ensure protection from jammers with unknown frequencies, an array of nonlinear resonators are formed with frequencies ranging from $2f_1$ to $2f_2$, as shown and described above with respect to FIGS. 4A and 4B.

Figure 7B:
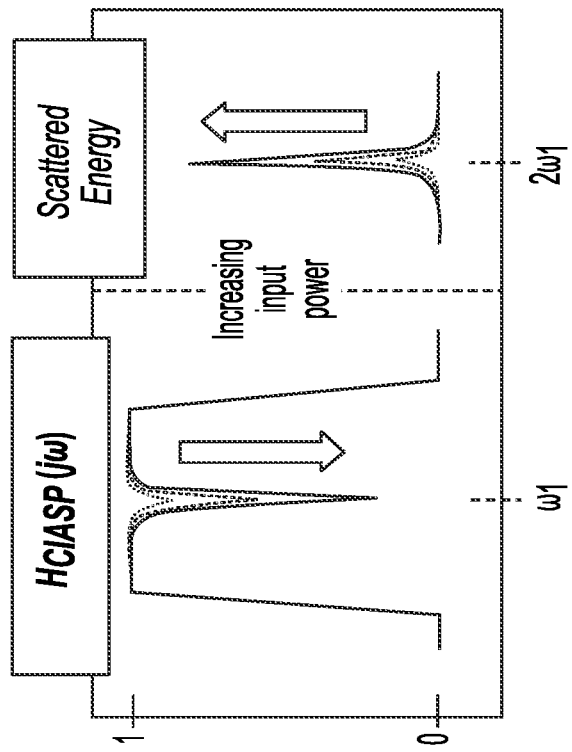
FIG. 7B shows the transfer function and the energy scattered by an adaptive filter as the power of a received jammer signal increases, in accordance with one exemplary embodiment of the present disclosure.
Figure 7A:
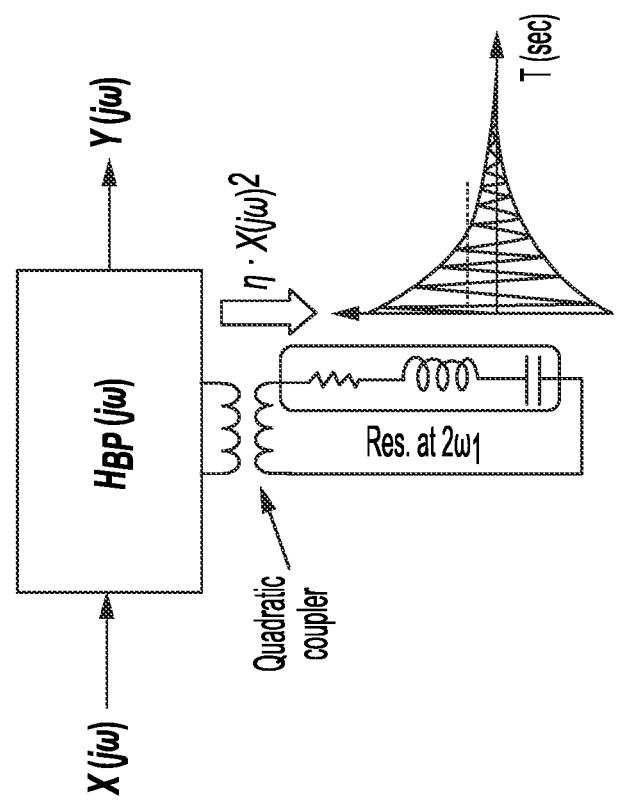
FIG. 7A shows the nonlinear scattering and damping of the energy of a signal by an adaptive filter, in accordance with one exemplary embodiment of the present disclosure.

FIG. 7A shows the nonlinear scattering and damping of the energy of a signal having a frequency of $\omega_1$ by an exemplary CIASP in accordance with one aspect of the present disclosure. FIG. 7B shows the transfer function of and the energy scattered (damped) by a CIASP as the power of a received jammer having a frequency of $\omega_1$ increases. As is seen, the higher the received input power, the deeper is the notch in the transfer function of the CIASP.

Figure 8B:
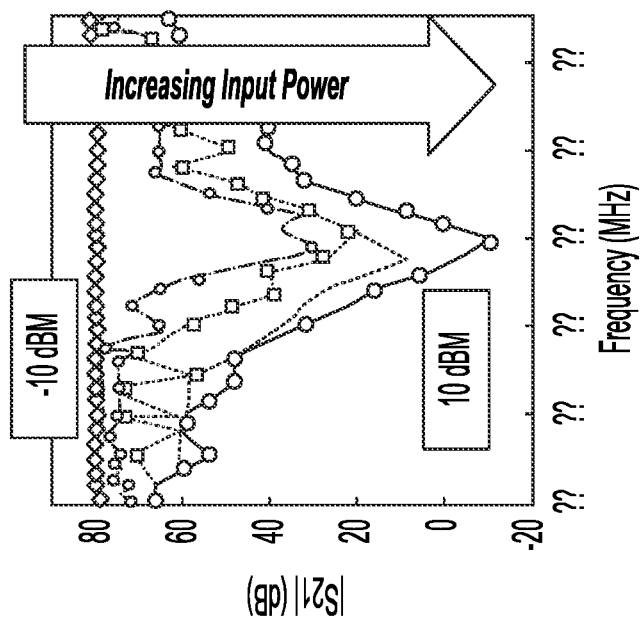
FIG. 8B shows the frequency response of a ferroelectric resonator receiving a bias and operating in the nonlinear regime, in accordance with one exemplary embodiment of the present disclosure.
Figure 8A:
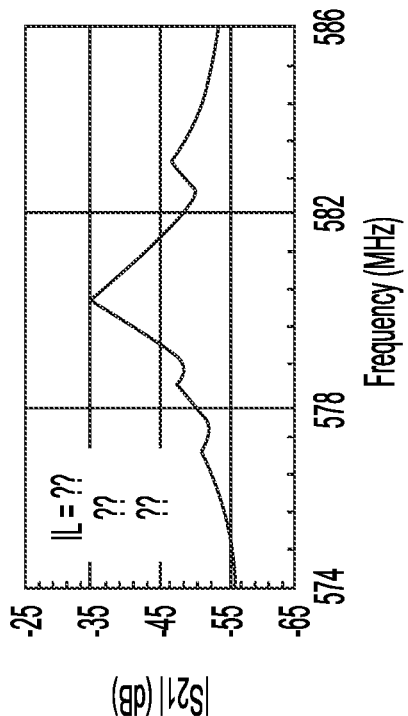
FIG. 8A shows the frequency response of a ferroelectric resonator receiving no bias and operating in the linear regime, in accordance with one exemplary embodiment of the present disclosure.

To demonstrate the nonlinear energy scattering behavior of a CIASP, Lamb-mode resonators were formed in ferroelectric hafnium zirconium oxide ($Hf_{0.5}Zr_{0.5}O_2$) films. A 580 MHz resonator was formed and biased at a suitable voltage for operation in nonlinear electromechanical transduction regime. The transfer function of the resonator was measured at around 290 MHz, corresponding to half of the resonator's resonant frequency. FIG. 8A shows the frequency response of the resonator when no bias is applied, thereby resulting in linear operation of the transducer and a high-quality factor peak at nearly 580 MHz. FIG. 8B shows the transfer function of the resonator when biased at 4V, for several different RF signal powers. It is seen that the application of the bias causes the resonator (transducer) to operate in a quadratic regime and form a notch at half of the resonant frequency. Furthermore, it is also seen that as the input power increases, the depth of the notch also increases adaptively.

Figure 9:
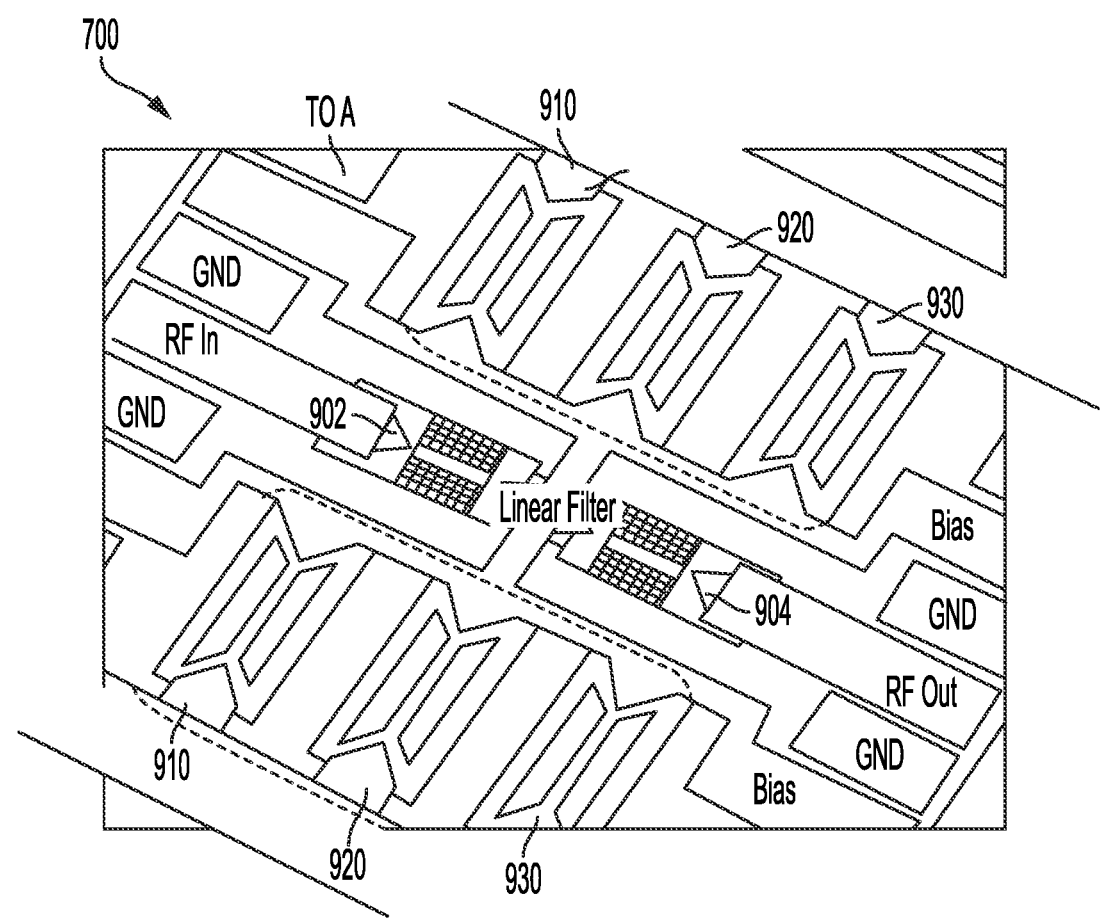
FIG. 9 is a scanning electron microscope image of an adaptive filter, in accordance with one exemplary embodiment of the present disclosure.

FIG. 9 is a scanning electron microscope image of an exemplary CIASP 700 having linear filters 902, 904, and nonlinear resonators 910, 920 and 930 disposed between the filters. FIGS. 10A-10D show the transfer function of the CIASP of FIG. 9 at input powers of −3 dBm, 6 dBm, 9 dBm, and 14 dBm respectively, and at frequencies corresponding to those of the power-limiting resonators 910, 920, and 930. It is readily seen that the depths of the notches increase as the input power increases.

Figure 11A:
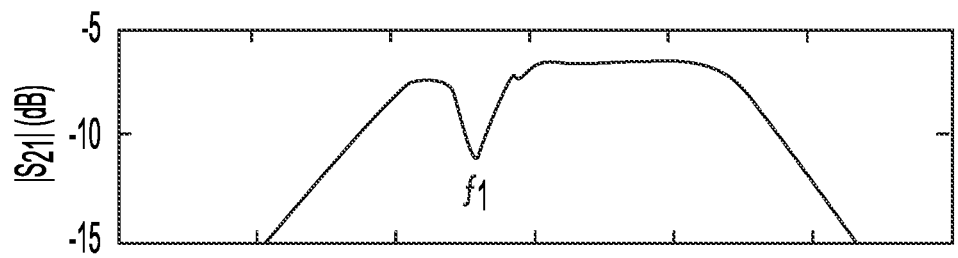
FIGS. 11A-11C show the measured frequency response of the adaptive filter of FIG. 9, in accordance with one exemplary embodiment of the present disclosure.
Figure 11B:
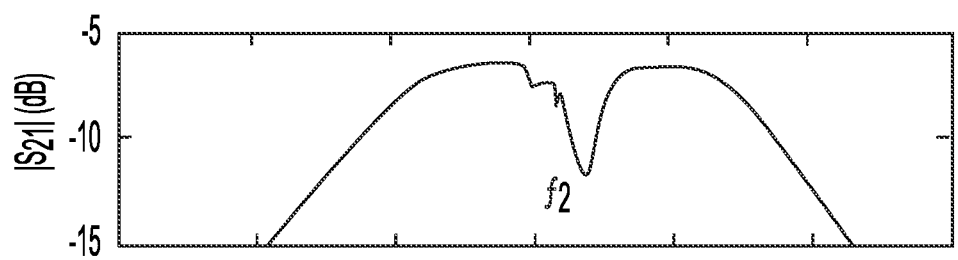
Figure 11C:
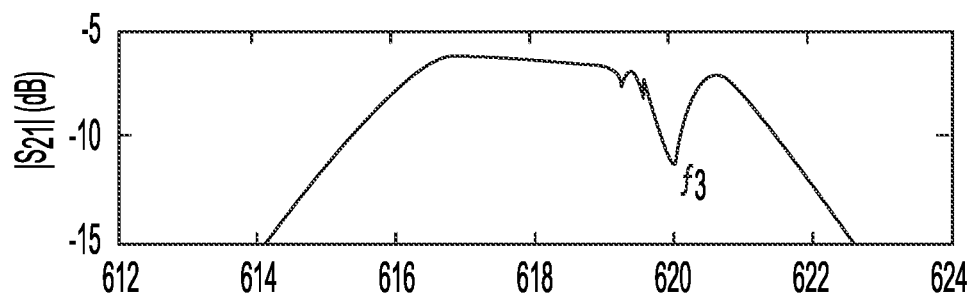

FIGS. 11A, 11B and 11C show the measured frequency response of CIASP 700 when CIASP 700 is excited at low input powers but with additional high-power jammers at frequencies corresponding to half of those of the non-linear resonators. As is seen from FIGS. 11A, 11B and 11C, CIASP 700 generates notches at the three different jammer frequencies of $f_1$, $f_2$ and $f_3$.

As described above with reference to FIG. 3A, a sinusoidal voltage $V_{in}=V_0 \sin(\omega t)$ received by an FSL resonator element, in accordance with the present disclosure, results in the following voltage across the resonator:

$$V_{FSL} \approx \eta_{es} V_0^2 \sin(2\omega t) \quad (1)$$

In expression (1), parameter $\eta_{es}$ represents the effective nonlinear, super-harmonic (also referred to herein as an-harmonic) coupling efficiency.

Figure 12:
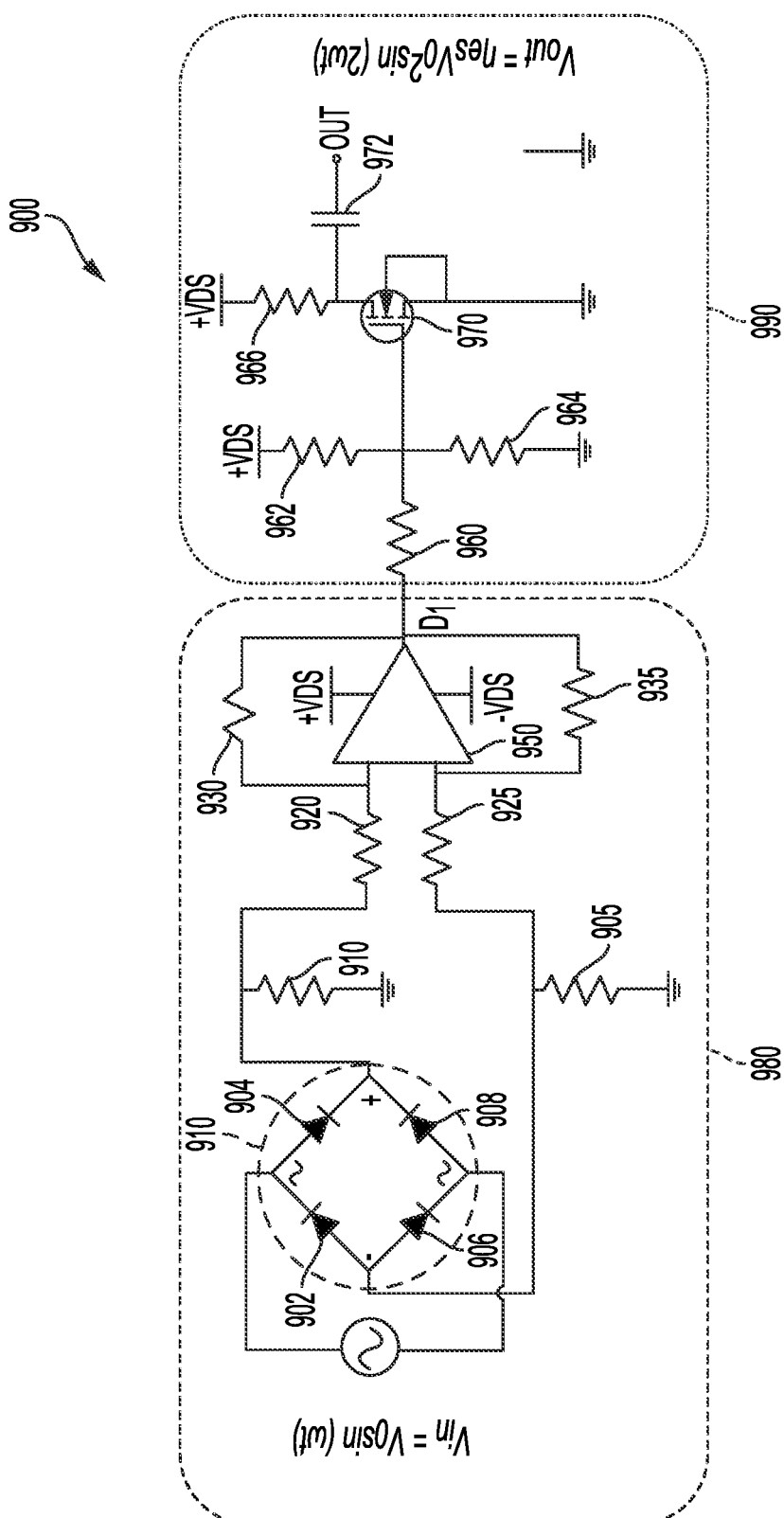
FIG. 12 is a schematic diagram of a circuit depicting the core operational principles of a nonlinear, quadratic transducer, in accordance with one exemplary embodiment of the present disclosure.

FIG. 12 is a transistor schematic diagram of a circuit 900 adapted to generate the voltage shown in expression (1) above from an input voltage defined by $V_{in}=V_0 \sin(\omega t)$. Circuit 900 is shown as including, in part, a frequency doubling circuit 980 and an amplitude squaring circuit 990.

Frequency doubling circuit 980 is shown as including a full-bridge diode rectifier 910, differential resistive loads 905, 910, current limiting resistors 920, 925, feedback resistors 930, 935 and a differential amplifier 950. Full-bridge diode rectifier 910, in turn, is shown as including diodes 902, 904, 906, 908. When the applied voltage has a positive value, diodes 904 and 906 are in conductive states, and diodes 902 and 908 are in non-conductive states. Conversely, when the applied voltage has a negative value, diodes 904 and 906 are in non-conductive states, and diodes 902 and 908 are in conductive states. Therefore, the voltage at the output of amplifier 950 (i.e., node $O_1$) has a frequency that is twice (i.e. $2\omega$) the frequency of the input signal.

Resistors 962 and 964 of amplitude squaring circuit 990 are adapted to bias the gate of the MOS transistor 970 to ensure that the transistor operates in a saturation region, thereby to square the amplitude of the received signal. Resistor 966 is a load resistor, and capacitor 972 prevents any DC current component from flowing to the output node Out. The voltage at the output node Out is defined by expression (1) shown above.

The above embodiments of the present invention are illustrative and not limitative. Other additions, subtractions or modifications are obvious in view of the present disclosure and are intended to fall within the scope of the appended claims.

We claim:

1. An adaptive filter comprising:
   a linear filter; and
   a first non-linear resonator coupled to the linear filter and adapted to resonate at a frequency that is an integer multiple of a frequency of a received RF signal, said adaptive filter filtering out the received RF signal.

2. The adaptive filter of claim 1 wherein said first non-linear resonator is adapted to generate a damped voltage that is substantially a square of a voltage of the received RF signal and that oscillates at the resonant frequency.

3. The adaptive filter of claim 1 wherein the resonant frequency is twice the frequency of the received RF signal.

4. The adaptive filter of claim 1 further comprising:
   a second non-linear resonator coupled to the linear filter and adapted to resonate at a frequency defined by a sum of the integer multiple of the frequency of the received signal and an offset frequency.

5. The adaptive filter of claim 4 further comprising:
   a third non-linear resonator coupled in series with the first non-linear resonator and adapted to resonate at the integer multiple of the frequency of the received signal.

6. The adaptive filter of claim 5 further comprising:
   a comparator adapted to compare a voltage across a resistor to a threshold voltage and to supply, in response, a current to a semiconductor substrate in which the first and third non-linear resonators are disposed, the voltage across the resistor formed in response to a current generated by the first and the third non-linear resonators.

7. The adaptive filter of claim 4 further comprising:
   a fourth non-linear resonator coupled in series with the second non-linear resonator and adapted to resonate at the frequency defined by the sum of the integer multiple of the frequency of the received signal and the offset frequency.

8. The adaptive filter of claim 1 wherein the resonant frequency of the first non-linear resonator is varied in response to varying a thickness of the first non-linear resonator.

9. The adaptive filter of claim 1 wherein the resonant frequency of the first non-linear resonator is varied in response to varying a lateral dimension of the non-linear resonator.

10. The adaptive filter of claim 1 wherein the resonant frequency of the first non-linear resonator is varied in response to a biasing voltage applied to the first non-linear resonator.

11. The adaptive filter of claim 1 wherein the resonant frequency of the first non-linear resonator is varied in response to heating of the first non-linear resonator.

12. The adaptive filter of claim 1 wherein the first non-linear resonator is a ferroelectric resonator.

13. The adaptive filter of claim 12 wherein the ferroelectric resonator includes a hafnium zirconium oxide ($Hf_{0.5}Zr_{0.5}O_2$) film.

14. A non-linear resonator biased to:
   receive an RF signal;
   resonate at a frequency that is an integer multiple of a frequency of the RF signal; and
   filter out the RF signal.

15. A method of filtering an RF signal, the method comprising:

receiving the RF signal at a first port coupled to a linear filter;

supplying an output signal of the linear filter to a first non-linear resonator adapted to resonate at a frequency that is an integer multiple of a frequency of the received RF signal; and filtering out the received RF signal.

16. The method of claim 15 wherein said first non-linear resonator is further adapted to generate a damped voltage that is substantially a square of a voltage of the received RF signal, the damped voltage oscillating at the resonant frequency.

17. The method of claim 15 wherein the resonant frequency is twice the frequency of the received RF signal.

18. The method of claim 15 further comprising:
coupling a second non-linear resonator to the linear filter, said second non-linear resonator adapted to resonate at a frequency defined by a sum of the integer multiple of the frequency of the received signal and an offset frequency.

19. The method of claim 18 further comprising:
coupling a third non-linear resonator in series with the first non-linear resonator, said third non-linear resonator adapted to resonate at the integer multiple of the frequency of the received RF signal.

20. The method of claim 19 further comprising:
coupling a fourth non-linear resonator in series with the second resonator, said fourth non-linear resonator adapted to resonate at the frequency defined by the sum of the integer multiple of the frequency of the received signal and the offset frequency.

21. The method of claim 19 further comprising:
comparing a voltage across a resistor to a threshold voltage; and supplying, in response, a current to a semiconductor substrate in which the first and third resonators are disposed, the voltage across the resistor formed in response to a current generated by the first and the third non-linear resonators.

22. The method of claim 15 further comprising:
varying the resonant frequency of the first non-linear resonator in response to varying a thickness of the first non-linear resonator.

23. The method of claim 15 further comprising:
varying the resonant frequency of the first non-linear resonator in response to varying a lateral dimension of the first non-linear resonator.

24. The method claim 15 further comprising:
varying the resonant frequency of the first non-linear resonator in response to a biasing voltage applied to the first non-linear resonator.

25. The method claim 15 further comprising:
varying the resonant frequency of the first non-linear resonator in response to heating the first non-linear resonator.

26. The method of claim 15 wherein the first non-linear resonator is a ferroelectric resonator.

27. The method of claim 26 wherein the ferroelectric resonator includes a hafnium zirconium oxide ($Hf_{0.5}Zr_{0.5}O_2$) film.

* * * * *